United States Patent Office 3,523,107
Patented Aug. 4, 1970

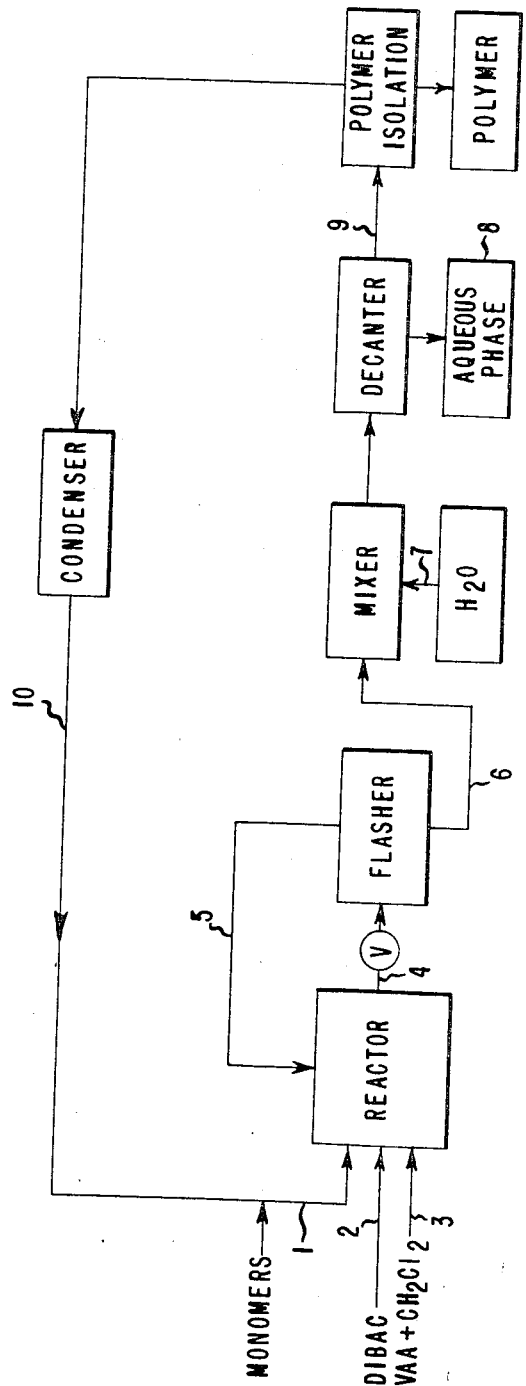

3,523,107
HALOGENATED HYDROCARBON CATALYST CARRIER FOR THE POLYMERIZATION OF ALPHA-OLEFINS
Phillip P. Spiegelman, Wilmington, Del., assignor to E. I. du Pont de Nemours and Company, Wilmington, Del., a corporation of Delaware
Filed Nov. 16, 1965, Ser. No. 508,113
Int. Cl. C08f *15/40*
U.S. Cl. 260—80.78                                                 8 Claims

ABSTRACT OF THE DISCLOSURE

A continuous polymerization process for preparing alpha-olefin polymers in a $C_4$–$C_{10}$ saturated hydrocarbon reaction medium using a vanadium coordination catalyst system where the vanadium component is supplied to the reactor in a solution of $C_1$–$C_3$ halogenated hydrocarbon catalyst carrier.

---

This invention relates to an improved continuous polymerization process for the preparation of α-olefin polymers in liquid media in the presence of coordination catalysts. In particular, it relates to such a process wherein a catalyst component is only sparingly soluble in the polymerization medium.

The preparation of α-olefin polymers with coordination catalysts is of great commercial importance today and for many reasons, it is desirable to carry out the manufacturing process continuously. Further improvement can be obtained by employing as a liquid medium for the polymerization system a substance which is low in cost, high in volatility, and unreactive with the catalyst, the monomers, and the product polymers in the system. Low-boiling saturated liquid hydrocarbons, such as hexane, display these advantages. Unfortunately, however, they may present problems which tend to limit their use in continuous processes.

It is generally desirable to add one or both of the coordination-catalyst components to the reactor in the form of a solution in a portion of the polymerization medium. Unfortunately, some coordination-catalyst components are not particularly soluble in the preferred hydrocarbon solvents. For example, vanadium tris(acetyl-acetonate) is available as a granular solid whose solubility in hexane is so low that prohibitively large quantities of hexane would be required to add it to the reactor as a hexane solution.

It has been found that continuous polymerization processes catalyzed by a coordination catalyst and conducted in a hydrocarbon medium in which one of the catalyst components is only slightly soluble, the polymerization reactor effluent being washed with water to remove the catalyst residue with the water phase and the hydrocarbon medium recovered from the washed effluent, dried, and recycled to the reactor, can be greatly improved by supplying said catalyst component to the reactor as a solution in a diluent, this diluent being characterized as a good solvent for the catalyst component, and maintaining a steady state of diluent in said reactor by extracting from said effluent by the water-wash step an amount of diluent equal to the amount added with the catalyst component.

In the broadest sense, the present invention involves establishing and maintaining in a reactor a steady-state concentration of a diluent or solvent introduced with the coordination-catalyst component by eliminating an equal amount of the diluent during a subsequent water washing of the reactor effluent. The existence of this steady state is critically dependent upon the water being able to compete with the polymerization medium for the diluent present; accordingly, the distribution coefficient, even though small (e.g., 0.01), cannot be zero. The distribution coefficient is the ratio of weight percent of diluent dissolved in the water phase divided by the weight percent remaining dissolved in the medium phase.

When the continuous process is begun, the monomers and polymerization medium are charged into the reactor and the diluent is fed into the reactor with a catalyst component dissolved therein. The polymerization effluent containing polymer, catalyst residue and all the diluent added is continuously removed and washed with water. During the washing step the greatest amount of diluent will remain in the polymerization medium phase but based on its distribution coefficient a certain relatively small amount will dissolve in the water. Eventually, the diluent will build up in the medium phase until an amount is reached where the quantity extracted in the water washing step is equal to that added with the catalyst component. The amount of water is selected to accomplish both the desired catalyst removal as well as the removal of about the same amount of diluent as that added with the catalyst component stream.

The diluent in the medium phase is returned to the reactor with the medium together with the continued monomer addition. It can be seen, therefore, that with careful selection of the type of diluent, the amount to be added with catalyst, the amount to remain in the reactor and the amount of water used in washing, a steady state will result without the need to monitor diluent concentration. The selection of these factors is well within the skill of one versed in the art when combined with the knowledge gained from the disclosure of this invention.

The processes chiefly involved are polymerizations of one or more α-olefins of about 2 to 18 carbon atoms. The invention particularly relates to the polymerization of one or more α-monoolefins such as ethylene, propylene, hexene-1, including halogenated monoolefins, e.g., 5,6-dibromohexene-1, with one or more non-conjugated diolefins such as 1,4-hexadiene, dicyclopentadiene, 5-methylene-2-norbornene, and the like. See U.S. Patents 2,933,-480, 3,000,866, 3,063,973, 3,093,620 and 3,093,621. The nature of the monomers is not regarded to be critical.

The polymerization medium is one which will exert no adverse effects on the monomers, the polymer produced or the catalyst components. Those chiefly involved are $C_4$–$C_{10}$ saturated liquid aliphatic or cycloaliphatic hydrocarbons, e.g., hexane or cyclohexane, as well as liquid monomers such as propylene, in which a catalyst component is only slightly soluble. The problem solved by this invention chiefly occurs when the solubility of the catalyst component is less than about 2 grams per 100 ml. of solvent medium at customary operating conditions. The invention is not dependent upon the polymer being formed in solution and is applicable to processes wherein the polymer is formed as a slurry in the polymerization medium.

The diluent employed to dissolve the catalyst component for addition to the reactor must also be free from adverse effects on the monomers, polymer or catalyst components. Further, it must be a good solvent for the particular catalyst component being dissolved. It is important that the diluent have a satisfactory distribution coefficient between water and the polymerization medium. A specific determination for methylene chloride is set forth hereinafter. In selecting a diluent, one having a great solubility for the catalyst component can be used in relatively small amounts and, for this reason, can have a low distribution coefficient since relatively little need be removed in the water washing step. Methylene chloride is typical of such a diluent. Conversely, those diluents having a lower solubility for the catalyst component must be used in greater quantities and must have a larger distribution coefficient to permit the greater amount to be removed in the water. A diluent having a distribution coefficient of about 0.01 or higher, for example, as high as 10 or more, is preferred. Chiefly concerned here are $C_1$–$C_3$ halogenated hydrocarbons. Methylene chloride ($CH_2Cl_2$) is particularly preferred; however, ethyl chloride, ethyl bromide, 1,2-dichloroethane and dichlorodifluoromethane are regarded as representative.

A representative and preferred embodiment of the present invention employs methylene chloride as the solvent for vanadium tris(acetylacetonate), the polymerization being carried out in hexane. Methylene chloride is of outstanding merit because it is a good solvent for vanadium tris(acetylacetonate) in the temperature range at which the catalyst is customarily used, it is compatible with the coordination catalyst system, and it can be eliminated from the system without the use of any additional process equipment or process steps.

It is estimated that a typical commercial scale polymerization process might require 35,000 gals. of catalyst feed solution every day if hexane were employed to dissolve the vanadium tris(acetylacetonate). In contrast, a minimum of 140 gals. a day would suffice were vanadium tris(acetylacetonate) supplied in methylene chloride. This result can be seen by comparing the maximum concentration of vanadium tris(acetylacetonate) in 100 ml. of hexane at 25° C. with that in methylene chloride under the same conditions; in hexane the solubility is 0.18 g., whereas in methylene chloride the maximum solubility is 44.9 g.

Although the invention is described in detail with respect to the solubilization of vanadium tris(acetylacetonate), it is equally applicable to other types of catalyst components, both solid and liquid, in instances where it is desired to introduce these catalysts into a reaction medium in which the component is not particularly soluble or miscible or in which some adverse type reaction might occur initially if the catalyst feed component were to be mixed with the major solvent before reaching the reactor. As is well understood by those skilled in the art, the transition metal component is frequently used in connection with a reducing agent such as an organo metal compound of Groups I to III of the Periodic Table such as an organo aluminum chloride. The selection of the other components will depend upon the needs of the particular reaction system; usually the solubilization of these components presents no difficulty. The relative proportions of transition metal components and reducing agents, if any, can be selected in accordance with customary teachings of the art and routine experimentation to obtain optimum results for the particular monomers and reaction medium in question. For further details on coordination catalysts see U.S. Patents 2,899,416, 2,962,451, 2,986,531 and 3,113,115.

The way in which the catalyst component is introduced into the reaction medium is not critical. In one procedure, a solution of the transition metal component is passed directly into the reactor, the coordination catalyst being formed in situ by separate introduction of the reducing agent. Alternatively, the transition metal component solution can be sent to a mixing zone where the coordination catalyst is formed by introduction of the reducing agent, the active catalyst then being passed into the reactor.

The effluent from the polymerization reactor is treated in the same manner as a conventional one employing the same liquid medium. The catalyst can be deactivated by any of the usual reagents such as alcohol or water. The catalyst residues themselves are at least partially removed from the polymer phase by extraction with water, optionally containing acid. After the aqueous phase has been separated the polymer can be isolated by any of the conventional procedures and the liquid hydrocarbon medium recovered and reused.

The invention will now be described in connection with the following specific example and in relation to the accompanying drawing of a process flowsheet; parts and percentages are by weight unless otherwise specified:

EXAMPLE

With reference to the drawing and table below which shows flows, pressures, and temperatures, ethylene, propylene, and 1,4-hexadiene are dissolved in a recycle stream of dry oxygen-free hexane and methylene chloride and fed to the reactor as stream 1. Diisobutylaluminum chloride (DIBAC) is dissolved in a portion of the recycle hexane-methylene chloride and fed as stream 2. Vanadium tris(acetylacetonate) (VAA) dissolved in dry methylene chloride, is fed as stream 3. The reactor is maintained at 40° C. by any suitable heat removal method and held at 350 p.s.i.a. to keep the entire reaction mixture in the liquid state. The effluent, stream 4, consisting of sulfur-curable, rubber-like ethylene/propylene/1,4-hexandiene terpolymer, hexane and methylene chloride, unreacted ethylene, propylene, and 1,4-hexadiene, and catalyst residues, is withdrawn continuously through a pressure reducing valve into a flash chamber in which a portion of the more volatile components are vaporized and returned via stream 5 to the reactor. The liquid phase polymer solution, stream 6, is fed continuously to a catalyst extraction mixer where it is contacted with water, stream 7, and then is fed to a phase separation decanter for removal of the aqueous phase, stream 8. Catalyst residues and an amount of methylene chloride equivalent to the catalyst feed stream are removed in the aqueous layer. The polymer solution, stream 9, is then fed to any of a number of devices well known in the art for vaporizing the solvent and collecting the terpolymer. The vaporized recycle solvent, stream 10, is condensed, dried and returned to the reactor feed stream.

The table below shows the temperature, pressure and composition in parts per hour beneath each column headed by a stream number:

TABLE

| | 1 | 2 | 3 | 4 | 5 | 6 | 7 | 8 | 9 | 10 |
|---|---|---|---|---|---|---|---|---|---|---|
| Temperature, °C | −20 | 25 | 25 | 40 | 35 | 35 | 30 | 30 | 30 | 30 |
| Pressure, p.s.i.a | 350 | 350 | 350 | 350 | 14.7 | 14.7 | 14.7 | 14.7 | 14.7 | 14.7 |
| Ethylene | 646 | | | 26 | 20 | 6 | | | 6 | 6 |
| Propylene | 684 | | | 334 | 150 | 184 | | | 184 | 184 |
| 1,4-hexadiene | 60 | | | 30 | 2 | 28 | | | 28 | 28 |
| Hexane | 4,950 | | | 5,200 | 250 | 4,950 | | | 4,950 | 4,950 |
| Methylene chloride | 1,401 | | 19 | 1,460 | 40 | 1,420 | | 19 | 1,401 | 1,401 |
| VAA | | | 3.5 | | | | | 3.5 | | |
| DIBAC | | 14.2 | | | | | | 14.2 | | |
| Water | | | | | | | 10,600 | 10,600 | | |
| Polymer | | | | 1,000 | | 1,000 | | | 1,000 | |

DISTRIBUTION COEFFICIENT DETERMINATION 200 cc. of polymer solution were prepared by dissolving 12.4 g. of a sulfur-curable, rubber-like ethylene/propylene/1,4-hexadiene terpolymer in 165.4 ml. of n-hexane and 20 ml. of methylene chloride. A 190-ml. portion of this solution was placed in a glass-stoppered bottle along with an equal volume of water, stirred for two hours at about 25° C., and then permitted to stand for an additional two hours. Samples of the aqueous phase, taken before and after mixing analyzed as follows:

|  | Percent chlorine |
|---|---|
| Before | 0.05 |
| After | 0.20 |

The calculated distribution coefficient of methylene chloride between the hexane polymer solution and water, based on this result, is 0.01 (wt. percent $CH_2Cl_2$ in aqueous phase)/(wt. percent $CH_2Cl_2$ in hexane solution).

This invention enables the use of a highly desirable polymerization medium in which a catalyst component is only slightly soluble without upsetting the process equilibrium or resorting to special monitoring techniques. Further, the use of prohibitively large volumes of solvents etc. is avoided.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a continuous α-olefin solution polymerization process catalyzed by a coordination catalyst having a vanadium component and an organo metallic chloride component of the metals belonging to Groups I to III of the Periodic Table and conducted in a reactor containing a $C_4$ to $C_{10}$ saturated hydrocarbon medium wherein (1) the solubility of said vanadium component is less than about 2 grams per 100 milliliters of hydrocarbon medium, (2) the reactor effluent comprised of polymer and catalyst is washed with water and (3) the hydrocarbon medium is recovered from said washed effluent, dried and recycled to the reactor; the improvement of (a) supplying said vanadium component to the reactor as a solution in a $C_1$–$C_3$ halogenated hydrocarbon, the vanadium component being highly soluble, in the $C_1$–$C_3$ halogenated hydrocarbon and the $C_1$–$C_3$ halogenated hydrocarbon having a distribution coefficient between water and said medium of at least 0.01, and (b) maintaining a steady concentration of halogenated hydrocarbon in said reactor by extracting from said effluent by said water-wash step an amount of said halogenated hydrocarbon about equal to the amount added in step (a) above.

2. A process improvement as defined in claim 1 wherein said vanadium component is vanadium tris(acetylacetonate).

3. A process as defined in claim 2 wherein said halogenated hydrocarbon is methylene chloride.

4. A process as defined in claim 3 wherein said saturated hydrocarbon medium is hexane.

5. A process as defined in claim 4 wherein said process is a polymerization of ethylene, propylene and 1,4-hexadiene.

6. A process as defined in claim 1 wherein said organo metallic chloride compound is organo aluminum chloride.

7. A process as defined in claim 6 wherein said organo aluminum chloride is diisobutyl aluminum chloride.

8. The process of claim 1 wherein both components of the coordination catalyst are added to the reaction in the $C_1$–$C_3$ halogenated hydrocarbon solution.

References Cited

UNITED STATES PATENTS

| 3,291,780 | 12/1966 | Gladding | 260—80.6 |
| 3,340,240 | 9/1967 | Natta | 260—88.2 |

JOSEPH L. SCHOFER, Primary Examiner

R. S. BENJAMIN, Assistant Examiner

U.S. Cl. X.R.

260—87.5, 88.2, 93.7, 94.9